United States Patent [19]

De With et al.

[11] Patent Number: 4,923,420
[45] Date of Patent: May 8, 1990

[54] METHOD OF MANUFACTURING CERAMIC TRANSLUCENT MATERIAL

[75] Inventors: Gijsbertus De With; Hendricus J. A. Van Dijk, both of Eindhoven, Netherlands

[73] Assignee: U.S. Philips Corp., New York, N.Y.

[21] Appl. No.: 317,371

[22] Filed: Mar. 1, 1989

Related U.S. Application Data

[62] Division of Ser. No. 598,959, Apr. 11, 1984, Pat. No. 4,841,195.

[30] Foreign Application Priority Data

Apr. 29, 1983 [NL] Netherlands .......................... 8301514

[51] Int. Cl.$^5$ ............................................. H01J 9/00
[52] U.S. Cl. ......................................... 445/22; 264/65
[58] Field of Search ............... 445/22, 26, 28; 264/61, 264/65; 501/152, 153

[56] References Cited

U.S. PATENT DOCUMENTS

| 3,711,585 | 1/1973 | Muta | 264/65 |
| 3,792,142 | 2/1974 | Kobayashi | 264/65 |
| 4,031,177 | 6/1977 | Auriol | 264/65 |
| 4,166,831 | 9/1979 | Rhodes | 264/65 |
| 4,396,595 | 8/1983 | Heytmeyer | 264/65 |
| 4,412,963 | 11/1983 | Hung | 264/65 |
| 4,629,593 | 12/1986 | Groth | 264/65 |
| 4,841,195 | 6/1989 | De With | 501/152 |

FOREIGN PATENT DOCUMENTS 0043776  4/1975 Japan ......................................... 264/65

Primary Examiner—Kurt Rowan
Attorney, Agent, or Firm—Emmanuel J. Lobato

[57] ABSTRACT

A powder mixture of yttrium and aluminum sulfates is prepared and heated in a oxidizing atmosphere. Silicon and/or magnesium compounds are added during the powder mixture preparation, or after it is heated and the resulting garnet powder is molded into the shape of a discharge envelope. The molding is then sintered.

12 Claims, 1 Drawing Sheet

METHOD OF MANUFACTURING CERAMIC TRANSLUCENT MATERIAL

This is a division of application Ser. No. 598,959, filed Apr. 11, 1984, now 4,841,195.

The invention relates to a high-pressure discharge lamp comprising a discharge envelope which accommodates an ionisable filling and two main electrodes, between which a discharge path extends, this discharge envelope having a wall of ceramic translucent material consisting mainly of densely sintered polycrystalline yttrium aluminium garnet, and to a method of manufacturing a high-pressure discharge lamp provided with a discharge envelope having a wall of such a material.

U.S. Pat. No. 3,767,745 discloses a high-pressure discharge lamp provided with a discharge envelope having a wall of translucent densely sintered polycrystalline yttrium aluminium garnet. In the known lamp, the material of the wall of the discharge envelope is obtained by hot pressing. In this method, a starting material is sintered at a high temperature and at high pressure. A disadvantage of the method used is that is requires complicated apparatus. A very great disadvantage is that with the known method only tubular bodies, such as discharge envelopes, can be obtained, whose density is considerably less than 100% of the theoretical density. The translucence is determined to a great extent by the density and will be at an optimum with a density of 100%. Densities which are less than 98% of the theoretical density in practice lead to such a low translucence that a practical use as material for the wall of a discharge envelope is excluded.

The invention has for its object to provide a discharge lamp comprising a discharge envelope having a wall of a translucent ceramic material which does not suffer from the limitations of the known lamp. For this purpose, according to the invention, the lamp mentioned in the opening paragraph is characterized in that the material of the wall of the discharge envelope contains at least one of the substances MgO and $SiO_2$ in an overall quantity of at least 50 ppm by weight, the absolute value of the difference between the $SiO_2$ and MgO contents being at least 50 ppm by weight, and an excess of MgO being at most 1000 ppm by weight.

In the lamp according to the invention, it has been found that the material of the wall of the discharge envelope sintered without external pressure is fully gas-tight and has a satisfactory translucence. The translucence of the material of the wall of the discharge envelope of the lamp according to the invention is in fact comparable with or is even better than that of the polycrystalline densely sintered aluminium oxide generally known and used as the material of the wall of discharge envelopes. Moreover, it has been found that the material of the wall of the discharge envelope has a very high resistance to corrosive effects of, for example, sodium vapour. It is supposed that the $SiO_2$ or MgO influences the crystal growth during sintering of the material as a result of which the material according to the invention has a uniform crystal size. With a difference in absolute value between the $SiO_2$ and MgO contents of a polycrystalline yttrium aluminium garnet of less than 50 ppm by weight, there is a considerable probability that the crystal size is non-uniform, as a result of which the translucence will be adversely affected. It is further possible that the density of such a material will be less than the minimum required value of 98% of the theoretical density. An excess of MgO of more than 1000 ppm by weight results in that the phenomenon of segregation of a second phase may occur, which unfavourably influences the translucence, the mechanical strength as well as the resistance to corrosive effects. The resistance to corrosive effects is of particular importance because in frequently used high-pressure discharge lamps the ionisable filling comprises substances, such as sodium amalgam and/or metal halides.

Russian Patent Specification No. 564,290 states the preparation of yttrium aluminium garnet by means of sintering in vacuo for obtaining laser material. For this purpose, the sintered material contains at least 0.1% by weight of magnesium oxide. Such a quantity of magnesium oxide, however, leads in practice to the occurrence of segregations of a second phase in the sintered final product. Thus, the material formed becomes unsuitable for use as wall material of a discharge envelope of a high-pressure discharge lamp.

Preferably, the ceramic material of the wall of the discharge envelope in an embodiment of the lamp according to the invention contains 500-1500 ppm by weight of $SiO_2$. In another embodiment, the material preferably contains 100-500 ppm by weight of MgO. With contents of $SiO_2$ and MgO of at least 500 ppm by weight and 100 ppm by weight, respectively, in fact it has been found in practice that the material comprises crystals of a very uniform crystal size, as a result of which a homogeneous density and a high translucence are obtained. A uniform crystal size further favours the mechanical strength of the material. The contents of $SiO_2$ and MgO are preferably chosen to be not larger than 1500 ppm by weight and 500 ppm by weight, respectively, because above the said values the phenomenon of segregation of a second phase may occur. The possibility of segregation of a second phase strongly increases with increasing contents by weight of the additions of $SiO_2$ and/or MgO.

Discharge envelopes for lamps according to the invention having a wall of polycrystalline yttrium aluminium garnet can be obtained by sintering $SiO_2$-and/or MgO-containing mixtures of oxides of Y and Al, of mixed oxides of these metals or of compounds supplying these oxides on heating. Furthermore, these mixtures may contain a flux or melting salt.

A discharge envelope having a wall of ceramic translucent material of a lamp according to the invention is preferably manufactured by a method which is characterized in that a powder mixture of mainly $Y_2(SO_4)_3$ and $Al_2(SO_4)_3$ is prepared by spray-drying an aqueous solution of the said sulphates, in that the powder mixture is heated in an oxidizing atmosphere at a temperature of 1150° C.–1400° C., a compound of Si and/or a compound of Mg being added before spray-drying or after heating the powder mixture, and in that the garnet powder thus obtained is then shaped preferably after disagglomeration into a desired moulding and in that the moulding thus obtained is sintered in vacuo at a pressure of at most 0.13 Pa or in hydrogen at a temperature of at least 1700° C.

In this description, the term "vacuum" is to be understood to mean an atmosphere consisting mainly of air or an inert atmosphere like nitrongas or one or more of the rare gases at a pressure considerably lower than the atmospheric pressure.

In the method according to the invention, the Si is preferably added to the acidified aqueous sulphate solution as ortho-ethyl silicate in a quantity equivalent to at least 100 ppm by weight of $SiO_2$ calculated with respect to the yttrium aluminium garnet to be formed. Such a quantity is the minimum quantity required for obtaining the desired material of the wall of a discharge envelope 5 because it has been found that part of the $SiO_2$ can evaporate during the process. In the method according to the invention, the Mg is added before or after spray-drying, preferably as magnesium acetate in a quantity equivalent to at least 100 and at most 2000 ppm by weight of MgO calculated with respect to the yttrium aluminium garnet to be formed. In this manner it is achieved that the Si and the Mg become distributed homogeneously through the powder mixture of $Y_2(SO_4)_3$ and $Al_2(SO_4)_3$.

The powder mixture thus formed is preferably converted into garnet powder by heating the powder mixture in air for 2-10 hours. When heating the air, it is not necessary to take measures for influencing the atmosphere, which simplifies the process. In spite of this simplification, powder is obtained which consists only of the desired phase, i.e. yttrium aluminium garnet.

The garnet powder obtained can thus be shaped into the desired moulding by pressing it isostatically. Another method of shaping the garnet powder into the desired moulding is extrusion of a mixture of the garnet powder with a binder, after which the moulding is heated at a temperature of 1000°-1400° C. in air. A process of isostatic pressing is a known method of shaping mouldings, which is particularly suitable for mouldings of comparatively large dimensions. On the contrary, extrusion is a particularly efficient method of manufacturing cylindrical mouldings in large numbers.

The moulding is preferably sintered in vacuo at a pressure of at most 0.13 Pa at a temperature of 1700°-1900° C. for 2-12 hours. Thus, a product of high density is obtained having a satisfactory translucence and a uniform crystal size.

A vacuum at a pressure of more than 0.13 Pa leads to irregular crystal size distribution and a lower density of the moulding, as a result of which the translucence and also the mechanical strength are adversely affected.

Experiments have shown that sintering the moulding for obtaining a minimum desired density of 98% of the theoretical density requires a temperature of 1700° C., whilst it has further been found that this temperature can be maintained for 12 hours. When the temperature is increased during sintering, it has been found that the time in which the desired density is reached becomes shorter. Thus, experiments have shown that a density of 98% of the theoretical density is reached already after 2 hours at a temperature of 1900° C. It has been found that a further increase in temperature leads to such a rapid crystal growth that this results in an irregular crystal size distribution and hence in a reduced translucence. Further, the evaporation of the yttrium aluminium garnet then begins to play a part.

An embodiment of a lamp according to the invention will be described more fully with reference to the diagrammatic drawing, in which.

Figure 1:
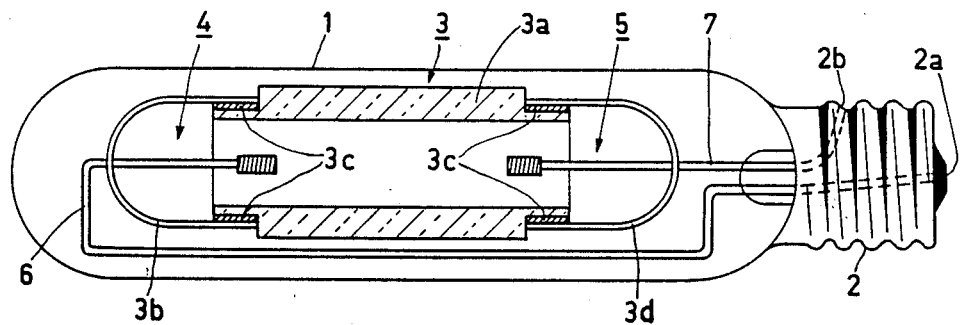
FIG. 1 shows in side view a lamp according to the invention.

In FIG. 1, reference numeral 1 denotes an outer bulb with a lamp cap 2. The outer bulb 1 encloses a discharge envelope 3. The lamp envelope 3 is composed of a cylindrical part 3a provided at both ends with sealing caps 3b and 3d hermetically sealed to the part 3a by means of melting glass 3c. The cylindrical part 3a has a wall formed from yttrium aluminium garnet. The sealing caps 3b and 3d consist of niobium and are each provided with an electrode 4,5 of tungsten secured by means of a soldering connection. The electrode 4 is electrically connected via a current conductor 6 to a connection contact 2a of the lamp cap 2. The electrode 5 is electrically connected via a current conductor 7 to a connection contact 2b of the lamp cap 2.

The filling of the discharge envelope contains 15 mg of amalgam comprising 22% by weight of Na and 78% by weight of Hg. Moreover, the filling contains xenon at a pressure of 10.5 kPa at 300K. The lamp is operated at a voltage of 220V, 50 Hz, via a stabilization ballast having an impedance of 135Ω. The overall power dissipated by the lamp is 77W with a light output of approximately 70 lm/W. The inner diameter of the discharge envelope is 3.3 mm and the electrode gap is 32 mm.

The cylindrical part 3a of the lamp described is formed as follows. A quantity of $Al_2(SO_4)_3 \cdot 16H_2O$ was dissolved in de-ionized water until a content of 28 mg of Al/g of solution was reached. Subsequently, $Y_2O_3$ was added to this solution whilst further diluting with water in such a manner that a stoichiometric ratio of Al and Y was reached. The pH of the solution was kept between 2.5 and 3.0 by the addition of $H_2SO_4$.

Ortho-ethyl silicate dissolved in $H_2SO_4$ was then added to this mixture, the quantity of Si being determined with reference to the yttrium aluminium garnet to be formed, corresponding to 2000 ppm by weight of $SiO_2$. The solution thus obtained was then spray-dried, after which the powder mixture obtained was heated in air to a temperature of approximately 1300° C. for 6 hours. This resulted in a powder consisting of a single phase, i.e. yttrium aluminium garnet having a specific surface area of 5 $m^2/g$. Subsequently, the powder was disagglomerated for approximately 8 hours.

A tubular moulding was obtained by extrusion of a mouldable mass containing the garnet powder obtained in the manner described above in a binder system of tylose, butyl stearate and water. The moulding was dried in air and sawn to size. Then the binder was baked out by heating the moulding for 4 hours in air at a temperature of 1250° C. After the baking-out process, the moulding was sintered in a vacuum of $1.3 \cdot 10^{-3}$ Pa. The temperature was brought to a value of 1400° C. in a period of 7 hours, was then kept constant for 9 hours, was then brought to 1800° C. in a period of 1.5 hours and kept constant for 4 hours, after which it was cooled at a rate of 200° C./h. The cylindrical tube thus obtained consisted of crystals having an average crystal size of approximately 10 μm and contained approximately 1000 ppm by weight of $SiO_2$.

Another tubular moulding of the same composition as the preceding moulding was subjected to another sintering process. In this case, the temperature variation consisted in that the temperature was continuously increased for approximately 12 hours to 1800° C., the temperature was kept constant at 1800° C. for 5 hours and the temperature was then continuously decreased for 6.5 hours. The cylindrical tube thus obtained contained also approximately 1000 ppm by weight of $SiO_2$ and consisted of crystals having a grain size of approximately 10 μm. The optical properties of the two tubes were the same.

Figure 2:
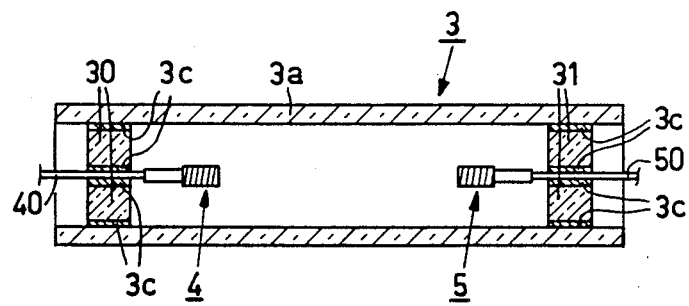
FIG. 2 shows a variation of the construction of a discharge envelope suitable for use in the lamp shown in FIG. 1.

In the case of a further lamp according to the invention, the latter was provided with a discharge envelope having a construction in accordance with the variation shown in FIG. 2. The cylindrical part 3a of the discharge envelope 3 was provided at its ends with sealing stops 30,31 which were secured by means of melting glass 3c to the cylindrical part 3a in a gas-tight manner. A pin-shaped lead-through conductor 40,50 of niobium was passed through each of the sealing stops 30,31 and was secured thereto by means of melting glass 3c in a gas-tight manner. Tungsten electrodes 4,5 were soldered to the lead-through conductors 40,50.

The filling of the discharge envelope contained 25 mg of amalgam comprising 22% by weight of Na and 78% by weight of Hg. Besides, the filling contained xenon at a pressure of 2.5 kPa at 300K. The lamp was operated at a voltage of 220V, 50 Hz. The power consumed by the lamp amounted to 50W and the luminous efficacy was 80 lm/W. The inner diameter of the discharge envelope was 3.5 mm and the electrode gap was 29 mm.

Both the wall of the cylindrical part 3a and the sealing stops 30,31 were formed from yttrium aluminium garnet containing MgO.

The MgO-containing mouldings were manufactured for the major part in the same manner as the above described $SiO_2$-containing mouldings. The Mg was then added in a first case in the form of Mg acetate to and dissolved in the sulphate solution with the stoichiometric ratio of Al and Y. The quantity of Mg was chosen so as to correspond to 500 ppm by weight of MgO with respect to the yttrium aluminium garnet to be formed. With the mixture thus obtained, a sintered tube and sealing stops were formed by the aforementioned method. The mouldings were then kept at a temperature of 1730° C. for 2 hours during sintering. The increase in temperature was effected continuously in a period of 4 hours. With decreasing temperature, a forced cooling was carried out in 30 minutes to 1000° C., after which a natural cooling took place. The pressure during sintering was $1.3 \, 10^{-3}$ Pa. The yttrium aluminium garnet of the tube and sealing stops obtained contained 250 ppm by weight of MgO and the average size of the crystals was approximately 20 μm.

In a second case of manufacturing a tubular moulding, the Mg was added after spraydrying in the form of Mg acetate to a slurry of stoichiometric yttrium aluminium garnet in ethanol, whilst a quantity of MgO corresponding to 500 ppm by weight with respect to yttrium aluminium garnet was also added. Subsequently, the slurry formed was dried and heated to 550° C., during which process the Mg acetate dissociated. The dried material was then disagglomerated in the manner described and it was processed in an analogous manner to a sintered moulding. The temperature variation during sintering was then as follows; the moulding to be sintered was brought in a period of 6 hours to a temperature of 1700° C., was then brought in a period of 45 minutes to 1775° C. and was then kept for 4 hours at a constant temperature. Cooling took then place at a rate of approximately 250° C. per hour. The pressure during sintering was $1.3 \, 10^{-3}$ Pa. In a tube thus formed, the yttrium aluminium garnet contained 250 ppm by weight of MgO and the average crystal size was approximately 5 μm. The optical properties of the MgO-containing tubes corresponded to those of the tubes containing $SiO_2$.

In order to illustrate the satisfactory translucence of the yttrium aluminium garnet according to the invention, the relative "in-line" transmission is measured and compared with that of polycrystalline densely sintered aluminium oxide. The absorption coefficient a according to the formula $I/I_o = \text{expt}(-\alpha d)$, in which: I is the intensity of the radiation beam after transmission, $I_o$ is the intensity of the radiation beam before transmission, and d is the thickness over which transmission takes place, is then determined for a radiation beam having a wavelength of 589 nm at an angle of aperture of approximately 0.14 rad. For yttrium aluminium garnet containing 1000 ppm by weight of $SiO_2$, the value of α is 1.6mm$^{-1}$, whilst for yttrium aluminium garnet containing 250 ppm by weight of MgO this value is 0.7 mm$^{-1}$. For polycrystalline densely sintered aluminium oxide of a quality which is frequently used in practice, a has a value of 2.1 mm$^{-1}$. The translucence of the yttrium aluminium garnet according to the invention proves therefore to be better than that of the polycrystalline densely sintered aluminium oxide compared therewith.

What is claimed is:

1. A method of manufacturing a high-pressure discharge lamp having a discharge envelope which accommodates an ionizable filling and two main electrodes between which a discharge path extends, and the discharge envelope having a wall of ceramic translucent material, said method comprising:
   preparing a powder mixture of mainly $Y_2(SO_4)_3$ and $Al_2(SO_4)_3$ by spray-drying an aqueous solution of the said sulphates,
   heating the powder mixture at a temperature of 1150°-1400° C. in an oxidizing atmosphere,
   adding an Si compound and/or an Mg compound before or after spray-drying or after heating the powder mixture,
   molding the garnet powder thus obtained into the shape of the discharge envelope, and
   sintering the moulding thus obtained in vacuo at a pressure of at most 0.13 Pa or in hydrogen at a temperature of at least 1700° C.

2. A method as claimed in claim 1, characterized in that ortho-ethyl silicate is added to the aqueous sulphate solution in a quantity equivalent to at least 100 ppm by weight of $SiO_2$ calculated with respect to the yttrium aluminium garnet to be formed.

3. A method as claimed in claim 1, characterized in that magnesium acetate is added before or after spray-drying in a quantity equivalent to at least 50 ppm by weight of MgO calculated with respect to the yttrium aluminium garnet to be formed.

4. A method as claimed in claim 1, 2 or 3, characterized in that the powder mixture is heated in air for 2–10 hours.

5. A method as claimed in claim 1, 2, or 3 characterized in that the garnet powder is shaped into a desired moulding by pressing it isostatically.

6. A method as claimed in claim 1, 2, or 3 characterized in that the garnet powder is shaped into the desired moulding by extrusion of a mixture of the garnet powder with a binder, after which the moulding is presintered at a temperature of 1000°-1400° C. in air.

7. A method as claimed in claim 1, 2 or 3, characterized in that the sintering process is effected in vacuo at a pressure of at most 0.13 Pa at a temperature of 1700°-1900° C. for 2–12 hours.

8. A method of manufacturing a discharge lamp according to claim 1, 2 or 3, further comprising the step of disagglomerating the garnet powder before molding of the same.

9. A method as claimed in claim 4, characterized in that the garnet powder is shaped into a desired moulding by pressing it isostatically.

10. A method as claimed in claim 4, characterized in that the garnet powder is shaped into the desired moulding by extrusion of a mixture of the garnet powder with a binder, after which the moulding is presintered at a temperature of 1000°–1400° C. in air.

11. A method as claimed in claim 4, characterized in that the sintering process is effected in vacuo at a pressure of at most 0.13 Pa at a temperature of 1700°–1900° C. for 2–12 hours.

12. A method of manufacturing a discharge lamp according to claim 4, further comprising the step of disagglomerating the garnet powder before molding of the same.

* * * * *